(12) United States Patent
Razeghi

(10) Patent No.: US 12,071,925 B2
(45) Date of Patent: Aug. 27, 2024

(54) WIND TURBINE BLADE WITH REINFORCING STRUCTURE

(71) Applicant: BLADE DYNAMICS LIMITED, Eastleigh (GB)

(72) Inventor: Rama Razeghi, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 0 days.

(21) Appl. No.: 18/026,220

(22) PCT Filed: Oct. 18, 2021

(86) PCT No.: PCT/EP2021/078764
§ 371 (c)(1),
(2) Date: Mar. 14, 2023

(87) PCT Pub. No.: WO2022/084226
PCT Pub. Date: Apr. 28, 2022

(65) Prior Publication Data
US 2023/0358208 A1 Nov. 9, 2023

(30) Foreign Application Priority Data
Oct. 19, 2020 (GB) ..................................... 2016561

(51) Int. Cl.
*F03D 1/06* (2006.01)
(52) U.S. Cl.
CPC ........ *F03D 1/0688* (2023.08); *F05B 2230/60* (2013.01); *F05B 2280/6003* (2013.01)

(58) Field of Classification Search
CPC .... F03D 1/0675; B32B 3/266; F05B 2230/60; F05B 2280/6003
See application file for complete search history.

(56) References Cited

U.S. PATENT DOCUMENTS

| 10,113,532 | B2 * | 10/2018 | Riahi | ...................... B29C 70/44 |
| 2005/0037678 | A1 * | 2/2005 | Mack | .................... B29C 70/226 |
| | | | | 442/181 |
| 2005/0048260 | A1 * | 3/2005 | Modin | .................... B32B 38/08 |
| | | | | 428/138 |

(Continued)

FOREIGN PATENT DOCUMENTS

EP    3505751 A1    7/2019
GB    2497578 A    6/2013

*Primary Examiner* — J. Todd Newton
*Assistant Examiner* — Cameron A Corday
(74) *Attorney, Agent, or Firm* — Nath, Goldbeg & Meyer; Tanya E. Harkins

(57) ABSTRACT

The present invention relates to a wind turbine blade (10) comprising an elongate reinforcing structure (62). The reinforcing structure (62) comprises a plurality of strips (63, 64, 65) of fibre-reinforced polymer arranged into adjacent stacks (66) of strips, and at least one alignment member (68). The latter comprises a plurality of alternating horizontal segments (70) and vertical segments (72), wherein a vertical segment of the alignment member is arranged between adjacent stacks of strips, and wherein a horizontal segment of the alignment member is arranged on top of or below each stack of strips. At least one of the vertical segments (72) comprises one or more apertures (84) for allowing resin to flow from one side of the vertical segment to the other side of the vertical segment.

16 Claims, 5 Drawing Sheets

(56) References Cited

U.S. PATENT DOCUMENTS

Figure 1:
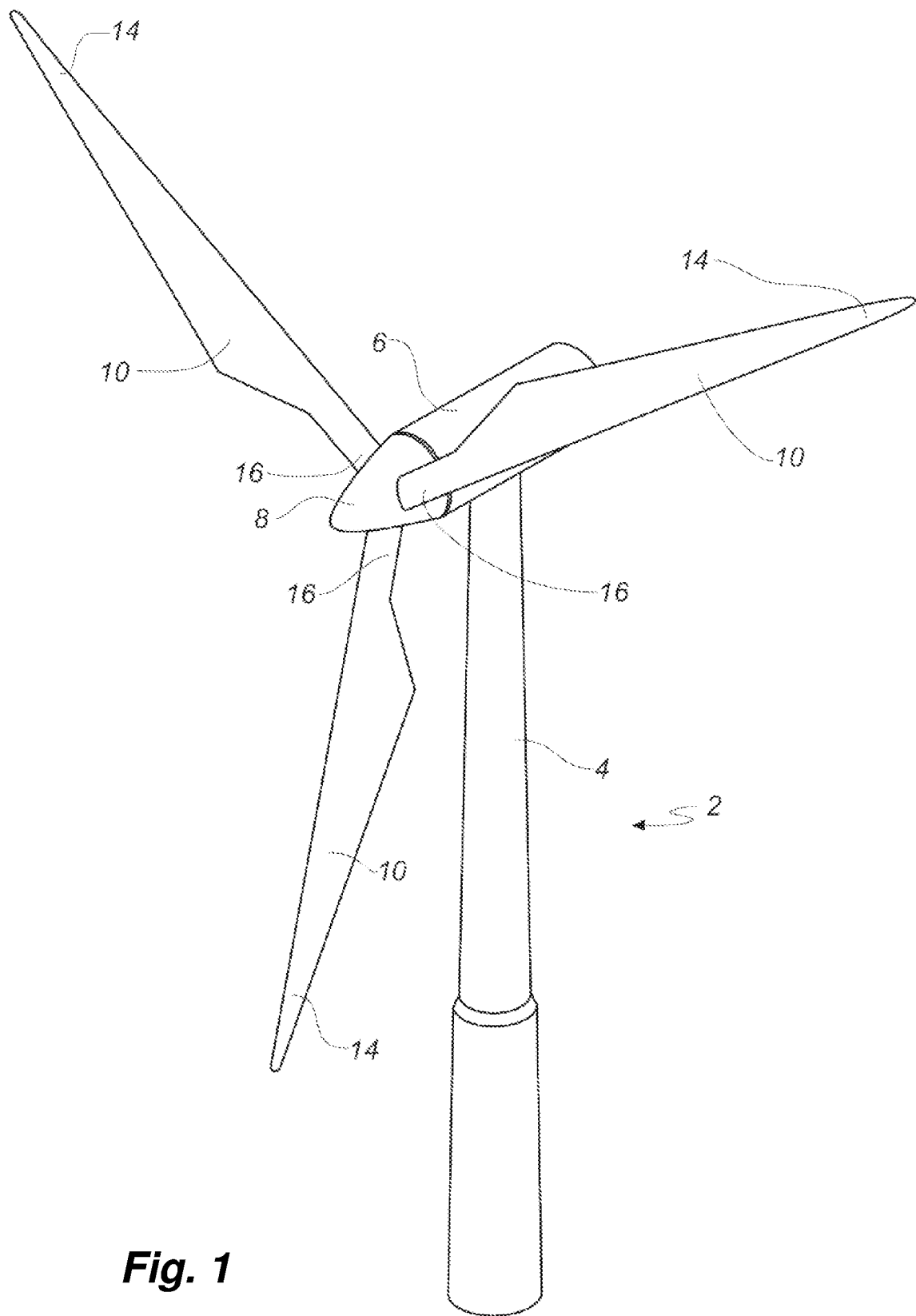

| | | | |
|---|---|---|---|
| 2008/0277053 A1* | 11/2008 | Stiesdal | ............... B29C 70/547 |
| | | | 156/245 |
| 2016/0305399 A1 | 10/2016 | Spandley et al. | |
| 2017/0218918 A1* | 8/2017 | Cieslak | .................... B32B 5/12 |
| 2018/0372066 A1 | 12/2018 | Livingston et al. | |
| 2019/0039337 A1* | 2/2019 | Nielsen | .................. B32B 3/266 |

* cited by examiner

WIND TURBINE BLADE WITH REINFORCING STRUCTURE

This is a National Phase Application filed under 35 U.S.C. 371 as a national stage of PCT/EP2021/078764, filed Oct. 18, 2021, an application claiming the benefit of Great Britain Application No. 2016561.9, filed Oct. 19, 2020, the content of each of which is hereby incorporated by reference in its entirety.

FIELD OF THE INVENTION

The present invention relates to a wind turbine blade comprises an elongate reinforcing structure and to a method of producing said wind turbine blade.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbine blades increases, various challenges arise from such blades being subjected to increased forces during operation, requiring improved reinforcing structures. In some known solutions, pultruded fibrous strips of material are used. Pultrusion is a continuous process in which fibres are pulled through a supply of liquid resin and then heated in an open chamber where the resin is cured. Such pultruded strips can be cut to any desired length.

However, the manufacturing of large reinforcing structures, such as spar caps or spar beams, in this way can be challenging, in particular when pultruded, carbon fiber-reinforced spar caps are used as the reinforcing members. Carbon fibres are typically lighter than glass fibres by volume, and have improved tensile and compressive strength. In some known approaches separate pultruded elements are used to form the reinforcing structure, and each element must be individually positioned within the structure of the shell. This can easily lead to laminate defects, such as voids, wrinkles or misaligned fibers, that may have disadvantageous effects on mechanical properties. Carbon pultrusion lay-up thus often results in slight overlap and/or misplacement of carbon pultrusion layers. Such defects and misalignments are often only identified after resin infusion.

WO 2001/088372 A1 discloses a spar cap for a wind turbine blade, which comprises a composite beam having multiple stacked preform layers of elongate and rigid unidirectional strength elements or rods, wherein each preform layer includes at least one fibre textile structure to which the strength elements or rods are joined to retain the strength elements or rods in a single layer. The fiber textile structure includes an interlocking textile fiber weave and a fabric made by stitching. The fibre textile structure extends across the transverse width of the preform layer and interfaces with individual strength elements or rods so that the fiber weave retains the elements or rods in a single preform layer.

EP 3174704 A1 relates to a method of making an elongate reinforcing structure for a wind turbine blade. The elongate reinforcing structure comprises a plurality of strips of fibre-reinforced polymer arranged into a stack structure, and at least one adjacent pair of the plurality of strips including an infusion promoting layer, wherein the infusion promoting layer is a fabric comprising a plurality of twisted yarns. The use of twisted yarn fabric helps in controlling the speed of infusion through the blade. The infusion promoting layer may be a glass-fibre fabric and may be interleaved between each pair of the plurality of strips in order to have the same influence on infusion speed throughout the stack structure. Furthermore, a partitioning layer is provided in between two stack structures, wherein overlapping edges of the infusion promoting layer are in contact with the partitioning layer.

While these prior art solutions may provide satisfactory resin infusion pathways, they suffer from the disadvantage of using complicated interlocking or partitioning structures, which require costly manufacturing and tedious arrangement within stacked structures. In addition, due to the fact that various materials and layers are combined, these arrangements are prone to undesired displacement during resin infusion, thus creating misalignments and defects in the finished stacked structure.

It is therefore an object of the present invention to provide a wind turbine blade with a reinforcing structure having improved stability.

It is another object of the present invention to provide a reinforcing structure for a wind turbine blade which is easily manufactured, handled and assembled.

It is another object of the present invention to provide a reinforcing structure for a wind turbine blade which avoids or reduces the above-discussed misalignments and defects.

It is another object of the present invention to provide a suitable reinforcing structure for a wind turbine blade which has a simple construction and is comparatively cheap to manufacture.

SUMMARY OF THE INVENTION

It has been found that one or more of the aforementioned objects can be obtained by providing a wind turbine blade comprising an elongate reinforcing structure, the reinforcing structure comprising
- a plurality of strips of fibre-reinforced polymer arranged into adjacent stacks of strips, and
- at least one alignment member comprising a plurality of alternating horizontal segments and vertical segments, wherein a vertical segment of the alignment member is arranged between adjacent stacks of strips, and wherein a horizontal segment of the alignment member is arranged on top of or below each stack of strips,
- wherein at least one of the vertical segments comprises one or more apertures for allowing resin to flow, preferably in a substantially chordwise direction, from one side of the vertical segment to the other side of the vertical segment.

It was found that this solution greatly reduces undesired overlap and/or misplacement of the plurality of strips of the fibre-reinforced polymer, in particular if carbon pultrusion layers are used. Thus, the arrangement of the present invention is advantageous in maintaining the required tolerances and positions of the strips along the length of the stacks. In addition, it was found that by providing the vertical segments with one or more apertures allows for an improved distribution of resin between adjacent stacks, e.g. in a VARTM process, while maintaining the desired structural stability.

The reinforcing structure will typically be a spar cap or a main laminate. In some embodiments, the reinforcing structure comprises a box spar. In other embodiments, the reinforcing structure comprises a spar beam. In a preferred embodiment, the elongate reinforcing structure is a spar structure, such as a spar cap, a spar beam or a box spar. It is preferred that the reinforcing structure extends along the blade in a spanwise direction. Typically, the reinforcing structure will extend over 60-95% of the blade length. The wind turbine blade is usually manufactured from two shell halves, a pressure side shell half and a suction side shell half. Preferably, both shell halves comprise an elongate reinforcing structure, such as a spar cap or a main laminate, according to the present invention.

The plurality of strips will typically extend in a spanwise direction of the blade. Thus, at least some of the strips have preferably a length corresponding to 60-95% of the blade length. It is particularly, preferred that each strip comprises a pultruded fibre material, such as a pultruded carbon fibre material. According to a preferred embodiment, the fibre-reinforced polymer comprises pultruded carbon fibres. In some embodiments, each strip contains a carbon fibre material. In other embodiments, each strip contains a glass fibre material. In other embodiments, each strip contains a glass fibre material and a carbon fibre material. In some embodiments, the strips may not contain any polymer when laying up the strips in the mould. In this embodiments, a polymer resin is typically infused into strips following the lay-up.

Each stack of strips may comprise 2-30, such as 3-20 strips successively arranged on top of each other. Thus, each stack will usually extend in a spanwise direction of the blade. In a midsection between a root end and a tip end, each stack may comprise 8-15 layers of strips, whereas towards the root end and towards the tip end the number of layered strips may decrease to 1-3. Thus, the stack of strips is preferably tapered towards both the root end and the distal end. Such configuration advantageously allows for a profile that is consistent with the thickness profile of the shell. Typically, two or more, or three or more stacks of strips are arranged next to each other, adjacent to each other in a substantially chordwise direction. In a preferred embodiment, the strips comprise pultruded strips, preferably pultruded strips comprising a fibre material, preferably carbon fibres. In some embodiments, the elongate reinforcing structure is a spar structure, such as a spar cap, a spar beam or a box spar.

Typically, a resin will be infused in the stack of strips containing a fibre material, such as a carbon fibre material, to form the fibre-reinforced polymer of the reinforcing structure. This can, for example, be done using vacuum-assisted resin transfer moulding. In other embodiments, a prepreg material can be used for the strips, which contains a fibre material pre-impregnated with a resin system, such as an epoxy resin.

The alignment member comprises a plurality of alternating horizontal segments and vertical segments. The horizontal segments may be part of a continuous horizontally extending plane, i.e. a plane extending in a spanwise and in a chordwise direction of the blade. Advantageously, a horizontal segment adjoins a vertical segment, which in turn adjoins the next horizontal segment, and so on. Each vertical segment preferably lies in a plane extending in a spanwise and in a flapwise direction of the blade. Typically, the alignment member comprises a plurality of alternating horizontal segments and vertical segments as seen in a substantially chordwise direction.

A vertical segment of the alignment member is arranged between adjacent stacks of strips. The space between adjacent stacks is preferably 0.3 mm to 3.0 mm, such as 0.3 mm to 1.0 mm, as seen in a substantially chordwise direction. The space between adjacent stacks is preferably preferably less than 0.5 mm, or less than 0.3 mm, as seen in a substantially chordwise direction. Thus, each vertical segment of the alignment member extends in a substantially flapwise direction, being either disposed between two adjacent stacks or adjacent to the last or first stack, as seen in the chordwise direction.

The horizontal segments of the alignment member are preferably arranged below the respective stacks of strips. It is preferred that the alignment member extends along the entire reinforcing structure as seen in a chordwise direction. It is particularly preferred that the alignment member extends along the entire reinforcing structure as seen in a spanwise direction. This was found to be particularly beneficial when transferring the alignment member together with the stacks of strips into the blade mould.

The elongate reinforcing structure will typically extend in a substantially spanwise direction. As used herein, the term vertical segment refers to a segment that extends in a substantially flapwise direction, such as lying in a plane spanned by the flapwise and the spanwise direction. Also, as used herein, the term horizontal segment refers to a segment that extends in a substantially chordwise direction, such as lying in a plane spanned by the chordwise and the spanwise direction.

In a preferred embodiment, the alignment member comprises at least three horizontal segments and at least two vertical segments. In some embodiment, the alignment member comprises at least three horizontal segments and at least three vertical segments. In a preferred embodiment, the alignment member comprises more horizontal segments than vertical segments, preferably one more horizontal segment than vertical segment. In some embodiments, the alignment member comprises at least three horizontal segments and at least two vertical segments.

In a preferred embodiment, the horizontal segments of the alignment member are arranged below each stack of strips, e.g. a first horizontal segment is arranged below the first stack of strips followed chordwise by a vertical segment that extends in a substantially flapwise direction, followed by a second horizontal segment arranged below the second stack of strips, and so on. In a preferred embodiment, the horizontal segments lie in the substantially same plane. It is preferred that the horizontal segments lie in a plane extending in a chordwise and in a spanwise direction, preferably directly underneath the stacks of strips.

In a preferred embodiment, the vertical segments lie in substantially parallel planes. It is preferred that the planes in which the vertical segments lie extend in a spanwise and in a flapwise direction. It is also preferred that each vertical segment laterally abuts at least one stack of strips. Usually, the vertical segments will be oriented substantially perpendicularly to the horizontal segments of the alignment member.

In a preferred embodiment, each of the vertical segments comprises a plurality of apertures for allowing resin to flow from one side of the vertical segment to the other side of the vertical segment. Each vertical segment may comprise 2-100, preferably 10-50 apertures. This allows for resin migration in a substantially chordwise direction. In a preferred embodiment, the apertures have a rectangular or an elliptical cross section, such as a circular cross section. In other embodiments, the apertures can be slits, slots or channels, such as spanwise extending slots.

In a preferred embodiment, at least one of the apertures, preferably several or all of the apertures, are located adjacent to an interface between two neighbouring strips within a stack of strips. This was found to enable a particularly advantageous resin distribution process within and across the stacks of strips. In a preferred embodiment, each of the adjacent stacks of strips comprises an interlayer arranged in between neighbouring strips. It is thus preferred that at least one of the apertures, preferably several or all of the apertures, are located adjacent to an interlayer arranged in between neighbouring strips. In a preferred embodiment, the interlayer is a resin flow promoting layer, such as a resin flow promoting fabric or mat. In some embodiments, the apertures may be arranged in spanwise extending rows of apertures, such 2-15 rows of apertures per vertical segment, wherein each row is separated from adjacent rows in the respective vertical segment by a vertical or flapwise distance.

In a preferred embodiment, the alignment member is composed of sheet metal, extruded metal, extruded or pultruded composites are mixtures thereof. The alignment member can be manufactured using an extrusion process, or a pre-designed mould or 3D printing/additive manufacturing. In some embodiments, the alignment member is made of a polymer material. In some embodiments, the alignment member comprises, or consists of, a glass fibre fabric. In other embodiments, the alignment member comprises, or consists of, a carbon fibre fabric.

In a preferred embodiment, the alignment member comprises at least three horizontal segments and at least two vertical segments. In a preferred embodiment, the horizontal segments lie in the substantially same plane. Preferably, the alignment member is substantially rack-shaped.

In a preferred embodiment, the thickness of the alignment member, preferably the thickness of each horizontal and vertical segment of the alignment member, more preferably the thickness of each vertical segment of the alignment member, is between 0.1 and 3 mm. It is preferred that the thickness of the alignment member is between 0.1 and 0.5 mm, such as between 0.1 and 0.4 mm. The thickness of the vertical segments may be lower than the thickness of the horizontal segments. The thickness of the vertical segments is the shortest distance between its opposing lateral surfaces, said distance usually extending in a substantially chordwise direction. The thickness of the horizontal segments is the shortest distance between its opposing upper and lower surfaces, said distance usually extending in a substantially flapwise direction.

In a preferred embodiment, the alignment member extends throughout the entire spanwise extent of the elongate reinforcing structure.

In other embodiments, the elongate reinforcing structure extends in a substantially spanwise direction of the blade, wherein the elongate reinforcing structure has a tip end, closest to the tip end of the blade, and a root end, closest to the root end of the blade, wherein a first alignment member is arranged at the tip end of the elongate reinforcing structure, and a second alignment member is arranged at the root end of the elongate reinforcing structure. Thus, the blade of the present invention may comprise at least two alignment members. In some embodiments, the first and second alignment members may extend 0.1-2 meters from the respective root end or tip end of the elongate reinforcing structure, as seen in a spanwise direction. In other embodiments, the blade of the present invention may comprise multiple alignment members, such as at least 10 or at least 20 alignment members.

In one embodiment, the elongate reinforcing structure extends in a substantially spanwise direction of the blade, wherein the elongate reinforcing structure has a tip end, closest to the tip end of the blade, a root end, closest to the root end of the blade, and a spanwise midpoint having an equal distance from each of the tip end and the root end of the elongate reinforcing structure, wherein a single alignment member is arranged at the spanwise midpoint of the elongate reinforcing structure. In some embodiments, the single alignment member may extend 0.1-2 meters in a spanwise direction.

In some embodiments, the elongate reinforcing structure extends in a substantially spanwise direction of the blade, wherein the elongate reinforcing structure comprises a spanwise extending front edge, which is closest to the leading edge of the blade, and a spanwise extending rear edge, which is closest to the trailing edge of the blade, wherein one of the vertical segments of the alignment member is arranged adjacent to the front edge of the elongate reinforcing structure, and wherein one of the vertical segments of the alignment member is arranged adjacent to the rear edge of the elongate reinforcing structure. It is preferred that the two respective vertical segments of the alignment member abut the respective rear or front edge of the elongate reinforcing structure.

In a preferred embodiment, the chordwise extent of the alignment member is between 1 and 10 meters. It is preferred that the alignment member extends along the entire chordwise dimension of the elongate reinforcing structure. In one embodiment, an infusion promoting layer is interleaved between the strips of each stack.

In a preferred embodiment, the vertical segments of the alignment member extend over the thickness, i.e. the flapwise extent, of each stack. Typically, the thickness of each stack is defined by the sum of the individual thicknesses of the strips, and optionally intermediate layers, within a given stack.

In another aspect, the present invention relates to a wind turbine blade comprising an elongate reinforcing structure, the reinforcing structure comprising a plurality of strips of fibre material, preferably pultruded strips of fibre material, arranged into adjacent stacks of strips, and an alignment member comprising a planar horizontal portion and a plurality of vertical segments extending generally normal to the planar horizontal portion in a spanwise direction, wherein a vertical segment of the alignment member is arranged between adjacent stacks of strips, wherein the planar horizontal portion is arranged below the stacks of strips, and wherein at least one of the vertical segments comprises one or more apertures for allowing resin to flow from one side of the vertical segment to the other side of the vertical segment. The planar horizontal portion is preferably made up of the plurality of horizontal segments as discussed above. Typically, each vertical segment has a planar design.

In a preferred embodiment, each of the vertical segments comprises a plurality of apertures, such as through-holes, for allowing resin to flow from one side of the vertical segment to the other side of the vertical segment. Preferably, at least one of the apertures is located adjacent to an interface between two neighbouring strips within a stack of strip. In a preferred embodiment, each of the adjacent stacks of strips comprises an interlayer arranged in between neighbouring strips within a stack, wherein the interlayer preferably is a resin flow promoting layer. In some embodiments, the alignment member is composed of sheet metal, extruded metal, extruded or pultruded composites are mixtures thereof. Preferably, the alignment member comprises at least two vertical segments, such as at least three vertical segments or at least four vertical segments. In a preferred embodiment, the alignment member is substantially rack-shaped. In some embodiments, the thickness of the alignment member is between 0.5 and 3 mm. Preferably, the alignment member extends throughout the entire spanwise extent of the elongate reinforcing structure.

In another aspect, the present invention relates to a method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, the method comprising the steps of:

arranging a plurality of blade components in a blade mould, assembling an elongate reinforcing structure in the blade mould relative to the plurality of blade components, the reinforcing structure comprising a plurality of strips of fibre material arranged into adjacent stacks of strips, and at least one alignment member comprising alternating horizontal segments and vertical segments, wherein a vertical segment of the alignment member is arranged between adjacent stacks of strips, and wherein a horizontal segment of the alignment member is arranged on top of or below each stack of strips, wherein at least one of the vertical segments comprises one or more apertures for allowing resin to flow from one side of the vertical segment to the other side of the vertical segment, and infusing resin into the stacks of strips to form a fibre-reinforced polymer.

In a preferred embodiment, the step of infusing resin into the stacks of strips comprises effecting resin flow from at least one of the stacks of strips to an adjacent stack of strips through the one or more apertures. Such resin flow is typically in a substantially chordwise direction. In some embodiments, resin can be infused into the stack closest to the leading edge or closest to the trailing edge of the blade, wherein resin flow is effected from that stack to the other stacks of the reinforcing structure through the apertures, e.g. in a chordwise direction towards the trailing edge or towards the leading edge. In other embodiments, resin can be infused into a stack located at the center of the reinforcing structure, seen in a chordwise direction, wherein resin flow is effected from that stack to the other stacks of the reinforcing structure through the apertures, i.e. towards the leading edge and towards the trailing edge.

In a preferred embodiment, the step of assembling the elongate reinforcing structure comprises arranging the plurality of strips of fibre material into adjacent stacks of strips on the alignment member in the blade mould.

All features and embodiments discussed above with respect to the wind turbine blade of the present invention likewise apply to the method of the present invention and to the reinforcing structure, and vice versa.

Usually, the blade will comprise a pressure side shell half and the suction side shell half which are manufactured over the entire length of the wind turbine blade, i.e. over their entire final length. The pressure side shell half and the suction side shell half will typically be adhered or bonded to each other near the leading edge and near the trailing edge. Each shell half may comprise longitudinally/spanwise extending load carrying structures, such as one or more main laminates or spar caps, preferably comprising reinforcement fibres such as glass fibres, carbon fibres, aramid fibres, metallic fibres, such as steel fibres, or plant fibres, or mixtures thereof.

The shell halves will typically be produced by infusing a fibre lay-up of fibre material with a resin such as epoxy, polyester or vinyl ester. Usually, the pressure side shell half and the suction side shell half are manufactured using a blade mould. Each of the shell halves may comprise spar caps or main laminates provided along the respective pressure and suction side shell members as reinforcing structures. The spar caps or main laminates may be affixed to the inner faces of the shell halves.

The spar structure is preferably a longitudinally extending load carrying structure, preferably comprising a beam or spar box for connecting and stabilizing the shell halves. The spar structure may be adapted to carry a substantial part of the load on the blade. In some embodiments, the reinforcing structure is arranged within the pressure side shell half. In other embodiments, the reinforcing structure is arranged within the suction side shell half. In a preferred embodiment, the strips of fibre material are pultruded strips, preferably pultruded strips comprising carbon fibres According to another aspect, the present invention relates to a wind turbine blade obtainable by the method according to the present invention.

In a preferred embodiment, the pressure side shell half and the suction side shell half of the blade are manufactured in respective mould halves, preferably by vacuum assisted resin transfer moulding. According to some embodiments, the pressure side shell half and the suction side shell half each have a longitudinal extent L of 50-90 m, preferably 60-80 m. In a preferred embodiment, the pressure side shell half and the suction side shell half each comprise one or more layers of carbon fibres.

According to some embodiments, the method further comprises a step of arranging one or more shear webs in at least one of the shell halves, usually at the location of the reinforcing structure. Each shear web may comprise a web body, a first web foot flange at a first end of the web body, and a second web foot flange at a second end of the web body. In some embodiments, the shear webs are substantially I-shaped. Alternatively, the shear webs may be substantially C-shaped.

In another aspect, the present invention relates to a reinforcing structure for a wind turbine blade, the reinforcing structure comprising a plurality of strips of fibre-reinforced polymer arranged into adjacent stacks of strips, and at least one alignment member comprising at least one, such as a plurality of, alternating horizontal segment and at least one, such as a plurality of, vertical segment, wherein a vertical segment of the alignment member is arranged between adjacent stacks of strips, and wherein a horizontal segment of the alignment member is arranged on top of or below each stack of strips, wherein at least one of the vertical segments comprises one or more apertures for allowing resin to flow from one side of the vertical segment to the other side of the vertical segment.

As used herein, the term "spanwise" is used to describe the orientation of a measurement or element along the blade from its root end to its tip end. In some embodiments, spanwise is the direction along the longitudinal axis and longitudinal extent of the wind turbine blade.

DESCRIPTION OF THE INVENTION

Figure 2:
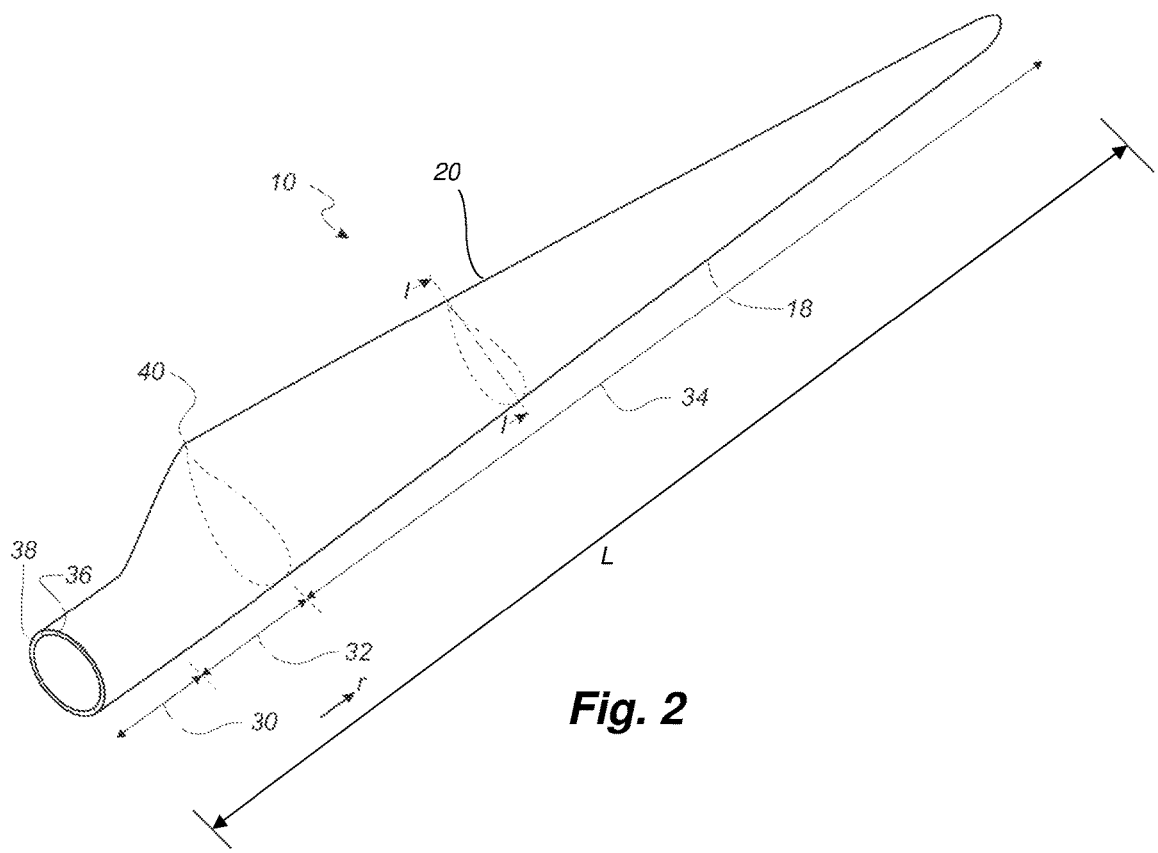
Figure 3:
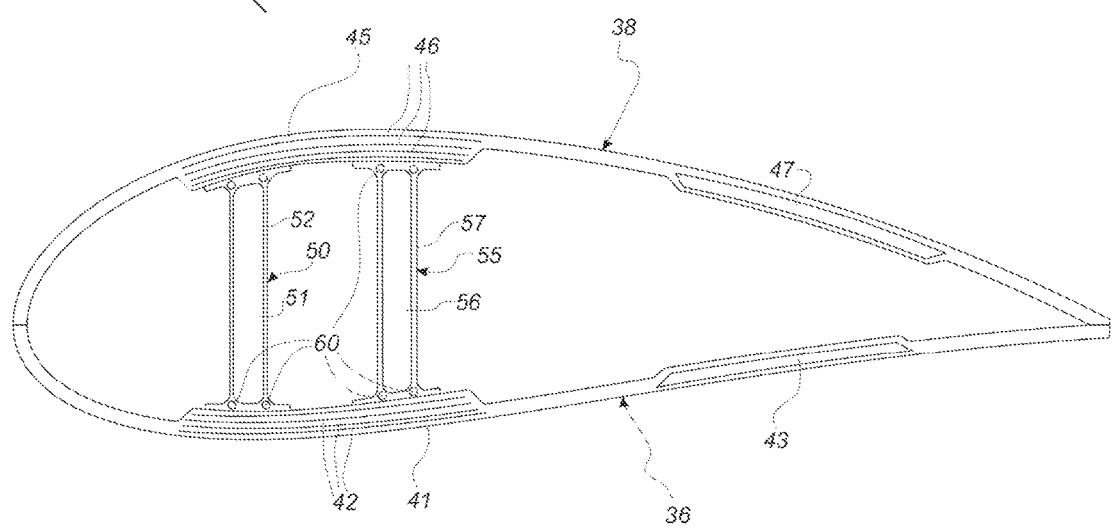
Figure 4:
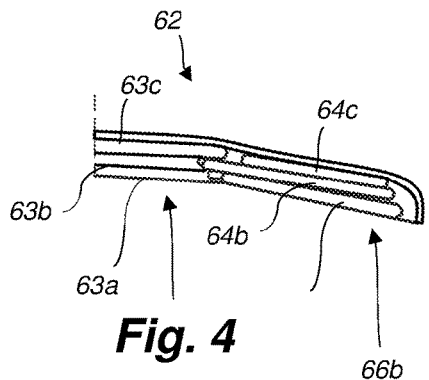
Figure 5:
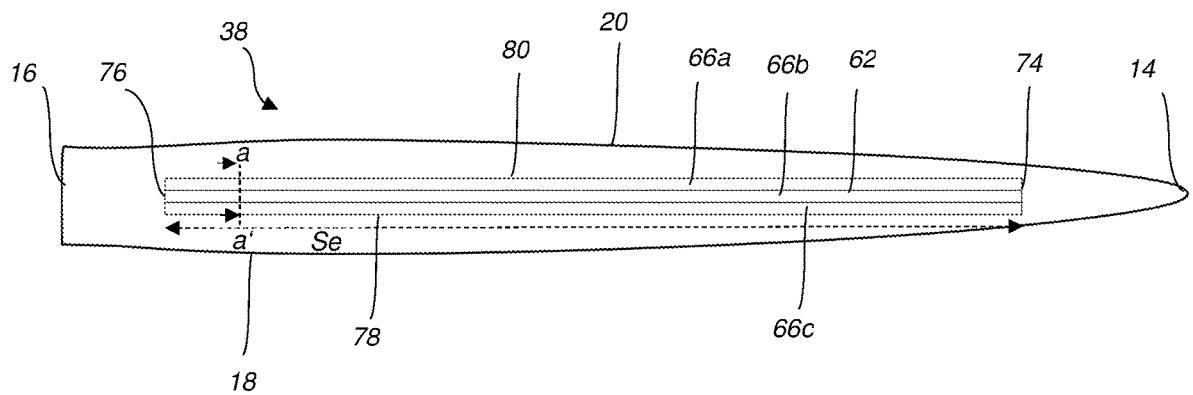
Figure 6:
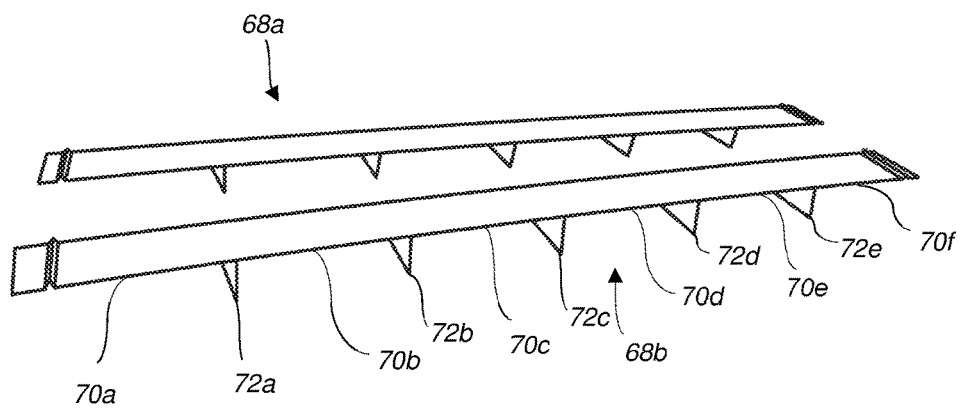
Figure 7:
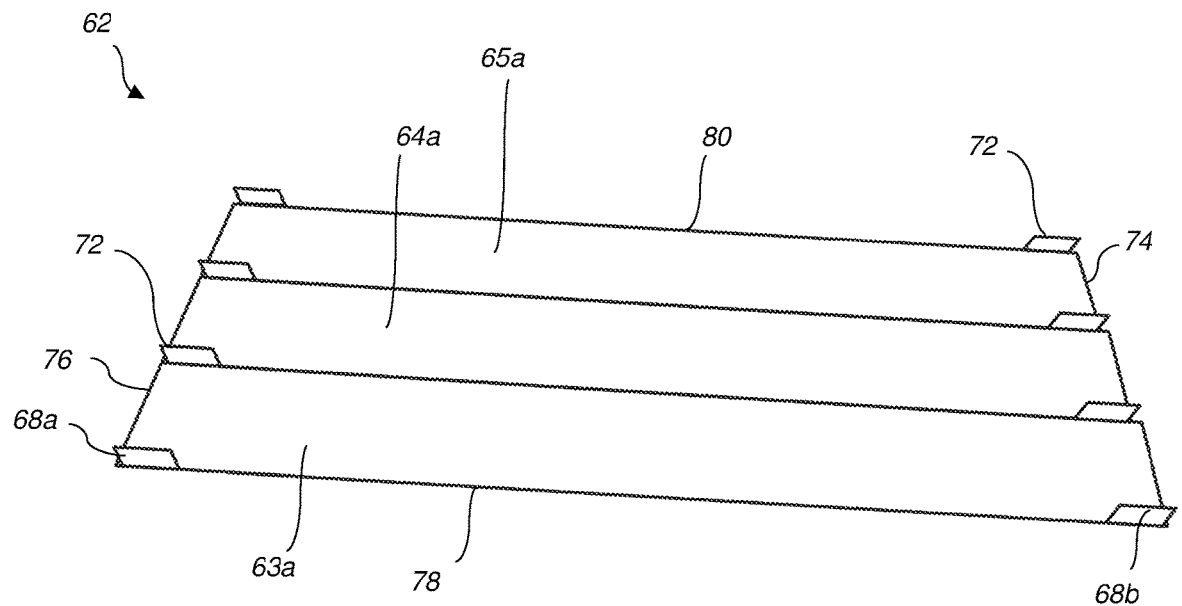
Figure 8:
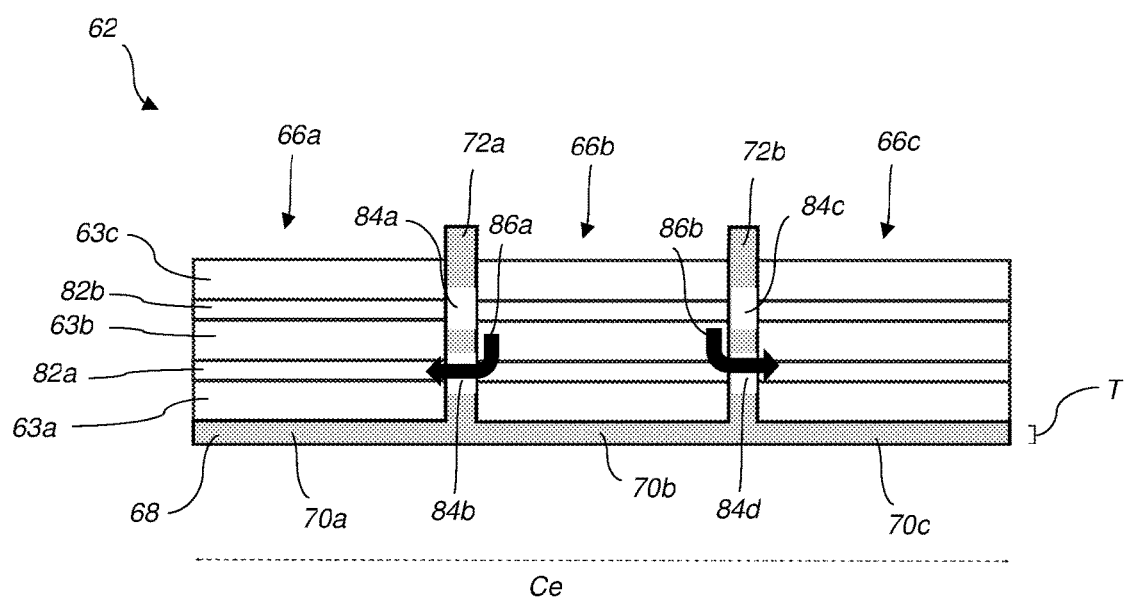
Figure 9:
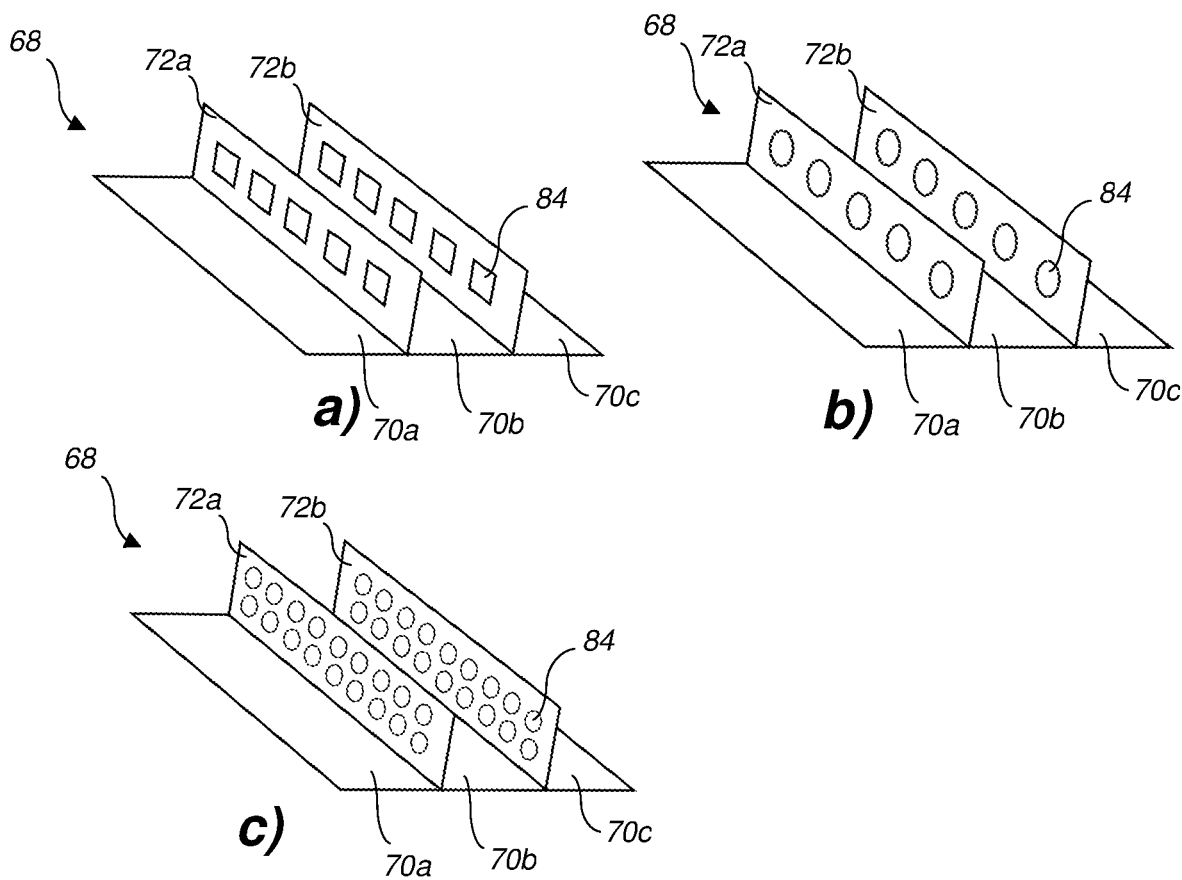

The invention is explained in detail below with reference to an embodiment shown in the drawings, in which FIG. 1 shows a wind turbine, FIG. 2 shows a schematic view of a wind turbine blade, FIG. 3 shows a schematic view of a cross-section of a wind turbine blade, FIG. 4 is a schematic cross sectional view of a reinforcing structure according to the prior art, FIG. 5 is a schematic top view of a shell half of a wind turbine blade according to the present invention, FIG. 6 is a perspective view of an alignment member according to the present invention, FIG. 7 is another perspective view of an alignment member according to the present invention, FIG. 8 is a cross sectional view of a reinforcing structure according to the present invention, taken along the line a-a' in FIG. 4, and FIG. 9 is a perspective view of several embodiments of alignment members according to the present invention.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 36 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges.

The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

FIG. 4 is a schematic cross sectional view of a reinforcing structure according to the prior art. As seen in FIG. 4, in prior art reinforcing structure 62 misalignments are formed within and between adjacent stacks 66a, 66b, comprising strips 63a-c, 64a-c of fibre-reinforced polymer. This problem is addressed by the present invention which has been found to result in greatly improved properties of the reinforcing structure with virtually no misalignments or related structural defects of the stacks of fibre-reinforced polymer.

FIG. 5 is a schematic top view of a shell half 38 of a wind turbine blade according to the present invention, illustrating the location of a reinforcing structure 62 having a spanwise extent Se. In the illustrated embodiment, the reinforcing structure 62 comprises three adjacent stacks 66a, 66b, 66c of strips of fibre-reinforced polymer arranged. As seen in the cross sectional view of FIG. 8, the alignment member 68 comprises a plurality of alternating horizontal segments 70a, 70b, 70c and vertical segments 72a, 72b, wherein vertical segment 72a is arranged between adjacent stacks 66a, 66b of strips 63, and so on. The horizontal segments 70a, 70b, 70c of the alignment member are arranged below the respective stacks 66a, 66b, 66c of strips. Both vertical segments 72a, 72b comprise respective apertures 84a, 84b, 84c, 84d for allowing resin to flow from one side of the vertical segment to the other side of the vertical segment in a substantially chordwise direction, as illustrated by the black arrows 86a, 86b in FIG. 8. In the illustrated embodiment, resin enters the center stack 66b from the top, and resin flow is effected from stack 66b to an adjacent stacks 66a, 66c through apertures 84a, 84b, 84c, 84d.

As seen in the cross section of FIG. 8, each of the apertures 84a, 84b, 84c, 84d is located adjacent to an interface between two neighbouring strips, e.g. strips 63a, 63b, within stack 66a. Also, each of the adjacent stacks 66a, 66b, 66c of strips comprises an interlayer 82a, 82b arranged in between neighbouring strips, i.e. at said interface, e.g. in between strips 63a, 63b. The interlayers 82a, 82b may be resin flow promoting layers. The alignment member 68 of the illustrated embodiment is substantially rack-shaped. FIG. 8 also illustrates the chordwise extent Ce, or width, of the alignment member 68, as well as its thickness T in the horizontal segments.

As illustrated in FIGS. 6 and 7, the alignment member 68 of the present invention may comprise a plurality of alternating horizontal segments 70a-d and vertical segments 72a-c. FIG. 7 is a perspective view illustrating the arrangement of a plurality of strips 63a, 64a, 65a on two alignments members 68a and 68b. This figure only illustrates the arrangements of the initial strip of each stack. A vertical segment 72 of the alignment member 68a is arranged between adjacent stacks started with the lowest strips 63a, 64a, 65a.

As seen in FIG. 5, the elongate reinforcing structure 62 extends in a substantially spanwise direction of the blade, with adjacent stacks 66a, 66b, 66c of strips. The elongate reinforcing structure 62 has a tip end 74, closest to the tip end of the blade, and a root end 76, closest to the root end of the blade. The elongate reinforcing structure also comprises a spanwise extending front edge 78, which is closest to the leading edge 18 of the blade, and a spanwise extending rear edge 80, which is closest to the trailing edge 20 of the blade.

FIG. 9 is a perspective view of several embodiments of alignment members 68 according to the present invention. In the embodiment illustrated in FIG. 9a, the apertures 84 in the vertical segments 72a, 72b have a rectangular cross section. In the embodiment illustrated in FIG. 9b, the apertures 84 in the vertical segments 72a, 72b have an elliptical cross section. FIG. 9c shows an embodiment with smaller elliptical apertures arranged in two spanwise extending rows per vertical segment 72a, 72b.

The invention is not limited to the embodiments described herein and may be modified or adapted without departing from the scope of the present invention.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
62 reinforcing structure
63 strip
64 strip
65 strip
66 stack
68 alignment member
70 horizontal segment
72 vertical segment
74 tip end of reinforcing structure
76 root end of reinforcing structure
78 front edge of reinforcing structure
80 rear edge of reinforcing structure
82 interlayer
84 aperture
86 resin flow direction
L length
r distance from hub
R rotor radius
T thickness of alignment member
Se spanwise extent of alignment member
Ce chordwise extent of alignment member

The invention claimed is:

1. A wind turbine blade (10) having a profiled contour including a pressure side and a suction side, and a leading edge and a trailing edge with a chord having a chord length extending therebetween, the wind turbine blade extending in a spanwise direction between a root end and a tip end, wherein the wind turbine blade comprises an elongate reinforcing structure (62), the reinforcing structure (62) comprising:

a plurality of strips (63, 64, 65) of fibre-reinforced polymer arranged into adjacent stacks (66) of strips; and at least one alignment member (68) comprising a plurality of horizontal segments (70) and a plurality of vertical segments (72), wherein the plurality of horizontal segments (70) and the plurality of vertical segments (72) are arranged in an alternating arrangement with respect to one another, wherein one of the vertical segments (72) of the at least one alignment member is arranged between adjacent stacks of strips, and wherein one of the horizontal segments (70) of the at least one alignment member is arranged on top of or below each of the stacks of strips, wherein at least one of the vertical segments (72) comprises one or more apertures (84) for allowing resin to flow from one side of the at least one of the vertical segments to the other side of the at least one of the vertical segments.

2. The wind turbine blade according to claim 1, wherein each of the vertical segments (72) comprises the one or more apertures (84), and wherein the one or more apertures (84) comprise a plurality of apertures (84).

3. The wind turbine blade according to claim 2, wherein at least one of the apertures (84) is located adjacent to an interface between two neighboring strips within a stack of strips.

4. The wind turbine blade according to claim 2, wherein the apertures (84) have a rectangular or an elliptical cross section.

5. The wind turbine blade according to claim 1, wherein each of the adjacent stacks (66) of strips comprises an interlayer arranged in between neighboring strips.

6. The wind turbine blade according to claim 5, wherein the interlayer is a resin flow promoting layer.

7. The wind turbine blade according to claim 1, wherein the alignment member is composed of sheet metal, extruded metal, extruded or pultruded composites, a thermoplastic material, or mixtures thereof.

8. The wind turbine blade according to claim 1, wherein the alignment member comprises at least three horizontal segments and at least two vertical segments.

9. The wind turbine blade according to claim 8, wherein the at least three horizontal segments lie in substantially the same plane.

10. The wind turbine blade according to claim 1, wherein the alignment member is substantially rack-shaped.

11. The wind turbine blade according to claim 1, wherein a thickness of the alignment member is between 0.5 and 3 mm.

12. The wind turbine blade according claim 1, wherein the alignment member extends throughout the entire spanwise extent of the elongate reinforcing structure.

13. A method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, the method comprising the steps of:
arranging a plurality of blade components in a blade mould;
assembling an elongate reinforcing structure (62) in the blade mould relative to the plurality of blade components, the reinforcing structure (62) comprising a plurality of strips of fibre material arranged into adjacent stacks of strips, and at least one alignment member comprising alternating horizontal segments and vertical segments, wherein one of the vertical segments of the alignment member is arranged between adjacent stacks of strips, and wherein one of the horizontal segments of the alignment member is arranged on top of or below each stack of strips, wherein at least one of the vertical segments (72) comprises one or more apertures for allowing resin to flow from one side of the vertical segment to the other side of the vertical segment; and
infusing resin into the stacks of strips to form a fibre-reinforced polymer.

14. The method of manufacturing a wind turbine blade according to claim 13, wherein the step of infusing resin into the stacks of strips comprises effecting resin flow from at least one of the stacks of strips to an adjacent stack of strips through the one or more apertures.

15. The method of manufacturing a wind turbine blade according to claim 13, wherein the step of assembling the elongate reinforcing structure comprises arranging the plurality of strips of fibre material into adjacent stacks of strips on the alignment member in the blade mould.

16. A reinforcing structure (62) for a wind turbine blade, the reinforcing structure (62) comprising:
a plurality of strips (63, 64, 65) of fibre-reinforced polymer arranged into adjacent stacks (66) of strips; and
at least one alignment member (68) comprising a plurality of horizontal segments (70) and a plurality of vertical segments (72), wherein the plurality of horizontal segments (70) and the plurality of vertical segments (72) are arranged in an alternating arrangement with respect to one another, wherein one of the vertical segments (72) of the at least one alignment member is arranged between adjacent stacks of strips, and wherein one of the horizontal segments (70) of the at least one alignment member is arranged on top of or below each of the stacks of strips,
wherein at least one of the vertical segments (72) comprises one or more apertures (84) for allowing resin to flow from one side of the at least one of the vertical segments to the other side of the at least one of the vertical segments.

* * * * *